United States Patent [19]

Johnston

[11] Patent Number: 5,351,595
[45] Date of Patent: Oct. 4, 1994

[54] THIN KERF CIRCULAR SAW BLADE

[75] Inventor: Jed G. Johnston, Leitchfield, Ky.

[73] Assignee: Vermont American Corporation, Louisville, Ky.

[21] Appl. No.: 950,834

[22] Filed: Sep. 24, 1992

Related U.S. Application Data

[63] Continuation-in-part of Ser. No. 810,912, Dec. 20, 1991.

[51] Int. Cl.⁵ .............................................. B27B 33/08
[52] U.S. Cl. .......................................... 83/848; 83/835
[58] Field of Search ................. 83/835, 848, 849, 850, 83/851

[56] References Cited

U.S. PATENT DOCUMENTS

| | | | |
|---|---|---|---|
| 3,176,732 | 4/1965 | Henderson | 83/852 |
| 3,496,973 | 2/1970 | Ballard | 83/835 |
| 3,651,841 | 3/1972 | Ohlsson | 83/835 |
| 3,981,216 | 9/1976 | Lemmon | 83/848 |
| 4,034,638 | 7/1977 | Drum | 83/835 |
| 4,123,958 | 11/1978 | Wright et al. | 83/837 |
| 4,144,777 | 3/1979 | Nystrom et al. | 76/112 |
| 4,232,578 | 11/1980 | Stellinger | 83/835 |
| 4,240,315 | 12/1980 | Tuomaala | 83/848 |
| 4,574,676 | 3/1986 | Jansen-Herfeld | 83/835 |
| 4,587,876 | 5/1986 | Erhardt | 83/835 |
| 4,627,322 | 12/1986 | Hayhurst, Jr. | 83/831 |
| 4,776,251 | 10/1988 | Carter, Jr. | 83/835 |
| 4,848,205 | 7/1989 | Suzuki et al. | 83/853 |

FOREIGN PATENT DOCUMENTS 442921 4/1975 U.S.S.R. ................ 83/835

*Primary Examiner*—Hien H. Phan
*Attorney, Agent, or Firm*—Middleton & Reutlinger

[57] ABSTRACT

The thin kerf circular saw blade of the present invention is a high speed saw blade having a plurality of spaced teeth around its periphery. The blade contains a plurality of radial slots extending inwardly from the periphery of the blade. A combination of features including the aggressive hook angle of the teeth, a plurality of expansion slots, a shallow gullet, reinforcing shoulder, carbide cutting elements, and a thin profile provide a saw blade for cutting a thin kerf at a high cutting speed. A slick coating including friction reducing and non-stick compounds reduce resin buildup and further improve the speed of cut of the thin kerf saw blade. The improved performance of the thin kerf saw blade in comparison with conventional carbide blades is attributable to the synergistic effect of optimizing the design parameters for each of the individual structural features and combining the features according to the present invention to obtain surprisingly good results including: an increased cutting speed, reduced tip wear, and reduced energy consumption.

20 Claims, 7 Drawing Sheets

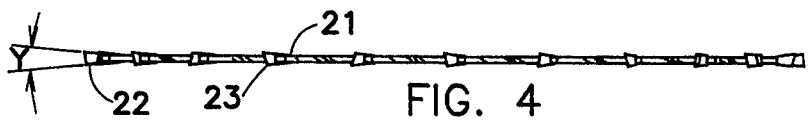
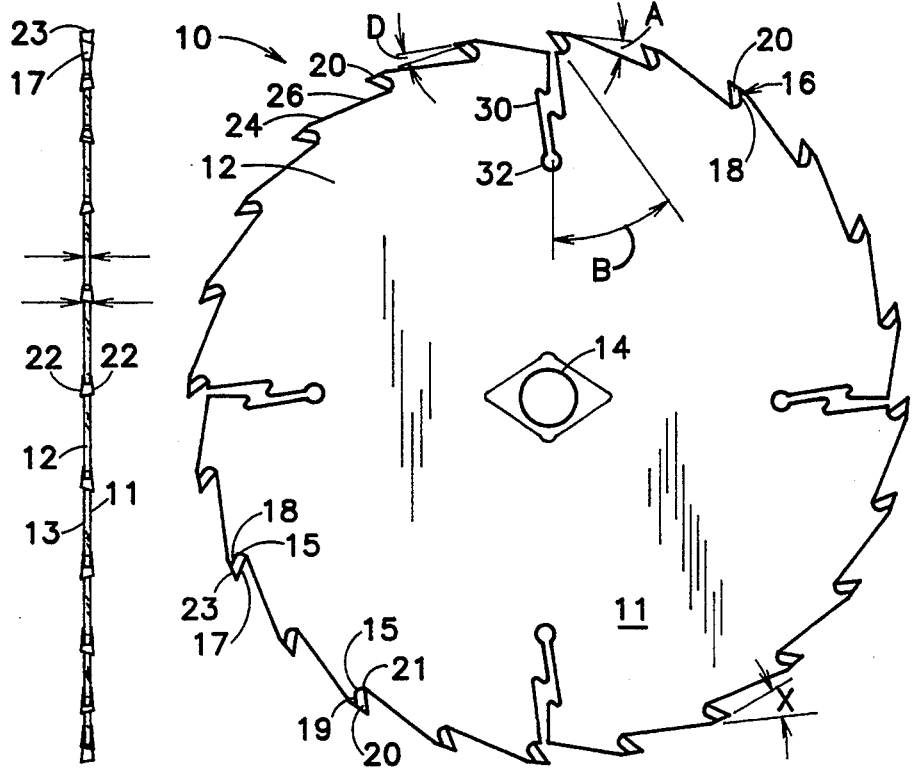
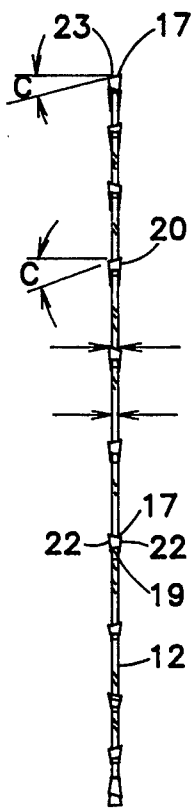
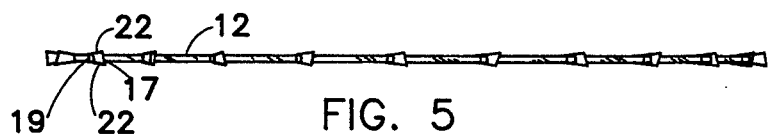
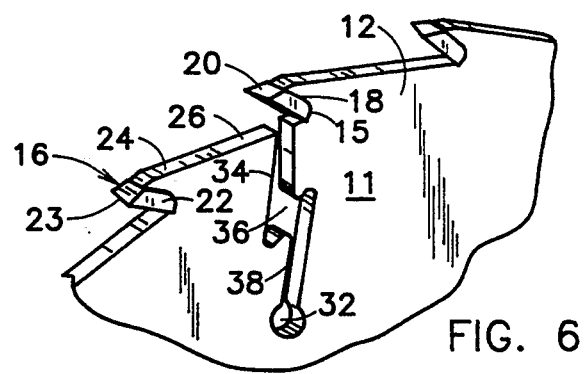

THIN KERF CIRCULAR SAW BLADE

This is a continuation-in-part application of Ser. No. 07/810,912 filed on Dec. 20, 1991.

BACKGROUND OF THE INVENTION

1. Field of the Invention

The present invention relates to a high speed circular saw blade having a plurality of teeth with aggressive hook angle, a plurality of generally radial expansion slots, a shallow gullet, reinforcing extended shoulder, carbide cutting elements, and a thin profile for cutting a thin kerf. A slick coating including friction reducing and non-stick compounds reduce resin buildup and further improve the speed of cut of the thin kerf saw blade. The improved performance of the thin kerf saw blade in comparison with conventional carbide blades is attributable to the synergistic effect of optimizing the design parameters for each of the individual structural features and combining the features according to the present invention to obtain surprisingly good results including: superior cutting speed, reduced tip wear, and reduced energy consumption as compared with conventional saw blades.

2. Description of the Prior Art

There are several types and designs of saw blades for cutting different types of material. Conventional circular saw blades have a plurality of teeth spaced about the outer periphery of the blade, and a plurality of expansion slots of various configurations in the outer edges of the blade in order to dissipate stress and prevent heat warpage of the blades. Expansion slots are not new to the industry and are intended to relieve stress, to aid in cleaning out the kerf, to attain straighter cutting action and to achieve other beneficial results. An expansion slot may be formed in a radial direction being directly aligned with the center of the blade, formed in a non-radial direction spaced around the periphery of the blade, formed having a positive angle, or formed at a negative angle. A positive angle is an angle such that the bottom of the slot trails a line extending from the center of the blade to the outer edge of the slot, relative to the direction of rotation of the saw blade. The bottom of a negative angle slot leads the radial line in the direction of rotation of the saw blade. The angle of the expansion slot is sometimes referred to as the "hook" of the slot, with a radial slot having a 0 degree hook, and positive and negative angle slots having positive and negative hooks, respectively. As the saw blade rotates cutting into the wood, the sawdust enters the space between the saw teeth and the face of the saw blade. As the sawdust comes in contact with the cutting edges at the expansion slots it is propelled by centrifugal force along the face of the teeth out of the area between the saw blade and the wood cut.

There are different types of saw blades having expansion slots of various designs for cutting specific types of material. Large diameter saw blades used for cutting green wood generally have diameters of from 30 to 100 inches in diameter. Because of the large size of the blades, green wood blades are generally operated at slow rotational speeds of about 500 to 1200 revolutions per minute (r.p.m.). to achieve a desirable speed at the cutting edges yet prevent damage to the large diameter blades having high peripheral speed. Fresh cut green wood also tends to swell against the blade due to fresh moist sawdust produced by the cutting action binding in the space between the face of the blade and the wood being cut. This causes excessive friction between the blade and the wood, and contributes to heat buildup. To minimize this problem these large diameter green wood blades are provided with wide expansion slots generally from ¼ to ½ inches wide and having a depth of typically ¼ of the diameter of the blade. The expansion slots are generally formed at a negative angle often with inserts at the trailing edges of the slots.

A drawback to using inserts in the expansion slots of a saw blade is that they tend to permit the blade to flop back and forth which is undesirable for cutting dry woods requiring a true cut. Also, wide slots cannot be used safely for dry woods because the production of hard dry wood splinters and chips can become wedged into wide expansion slots within the blade and thrown outward creating potential harm to the user. The use of narrow expansion slots in dry wood blades reduces the tendency of chips and splinters becoming wedged within the expansion slots and being thrown from the blade.

Most circular saws employed for cutting dry wood or precut wood are high speed saws. Conventional saw blades having a tip angle of about 20 degrees may have a diameter of up to about 30 inches, but generally have a diameter of about 20 inches or less. The rotational speed of the saw is inversely proportional to the diameter of the blade. For example, it is possible to run a 30 inch high speed saw blade at speeds up to about 1725 r.p.m. while a 20 inch high speed saw blade may be operated safely at 3,450 r.p.m., and a 14 inch saw blade may be operated safely at 5,000 r.p.m. Of these high speed saw blades, two types of saw blades frequently used are the "cut-off" saw blade designed for cutting across the grain of the wood, and "rip" saw blades designed for cutting lumber along the longitudinal direction or with the grain of the lumber.

As with the low speed blades, the high speed blades utilize expansion slots to prevent blade warpage due to heat buildup in the blade. Because sawdust buildup adjacent the face is not a problem with high speed blades used for cutting wood, it is not necessary to provide special designs for expansion slots for high speed blades. Typically, such slots are usually about one inch deep for a 12–30 inch blade and about ¾ inch for a 6 to 12 inch blade. Conventional high speed blades are formed at the same positive slot hook as the teeth of the blade of between about +10 degrees to about +25 degrees; however, the expansion slots may be formed in a radial direction or at a 0 degree hook.

SUMMARY OF THE INVENTION

The thin kerf circular saw blade of the present invention is a high speed saw blade comprised of a plurality of spaced teeth around its periphery. The blade contains a plurality of radial slots extending generally radially inwardly from the periphery of the blade with stress dispersion holes formed at the end of the slots. A combination of features improve the performance of the thin kerf saw blade, including an aggressive hook angle for the teeth, a plurality of expansion slots, a shallow gullet, reinforcing extended shoulder, tungsten carbide cutting elements, and a thin body profile provide an improved saw blade for cutting a thin kerf at a high cutting speed.

The leading edge of each tooth carries a hard cutting element extending substantially full length of the tooth face and welded or brazed full length to the tooth face. Static stresses are set up during the use of the blade because the coefficient of thermal expansion of the cutting elements is different from that of the body of the saw blade, so that when a unitary or full length cutting element is welded or brazed in place, stresses are set up in the body of the blade during cooling of the blade. These remain in the blade during operation increasing the likelihood of failure of the blade and a fracture of the cutting element. Moreover, the process of securing the cutting element in place may cause sufficient buildup of heat to provide an annealing action on the body of the blade, which is undesirable and prevents the blade from retaining proper tension. Friction is also caused by the rubbing of the sides of the kerf producing heat and causing excessive stresses in the cutting element and the blade. When the saw operates under binding conditions, the unitary cutting element is relatively rigid and cannot flex.

A saw blade constructed accordingly to the present invention minimizes the heat buildup and stress related problems of prior art saw blades. There are less static stresses because the cutting elements cut a kerf wider than the main blade body into the wood. The alternating top bevel of the cutting elements reduce lateral pressure from the wood against the sides of the blade body so that the saw tends to effectively work its way through binding conditions without creating excessive heat and facilitate cooling running of the blade. The alternating top bevel of the cutting edges improves the accuracy of the cut.

The expansion slots dissipate heat generated by friction between the workpiece and the cutting elements. This prevents the buildup of static stresses in both the cutting element and the body of the blade, thereby lessening the likelihood of fracture of the blade when in use, under dynamic stress. When the saw is in a bind, the expansion slots allow relative lateral movement of the cutting elements with respect to one another and permit the plural cutting elements to go back to normal after the binding action recedes. When operating in a bind, the irregular shape of the expansion slots of the thin kerf saw blade tend to break up the collected dust in the kerf and carry it out more efficiently than conventional saw blades having straight slots. Moreover, the stresses the thin kerf saw blade experiences cutting a thin kerf are less than that of a conventional blade cutting a thicker kerf because cutting a wider kerf requires more force, more energy, and more time using a wider conventional saw blade, thus increasing the dynamic stresses on both the cutting elements and the body of the conventional saw blade.

Due to the use of an aggressive hook angle the thin kerf blade is designed utilizing a shallow gullet to provide additional support and structural strength to the tooth configuration and provide superior performance. The shallow gullet utilized with the present invention runs truer than a deep gullet used in conventional blades and reduces the flexing of the cutting elements and blade body.

The reinforcing, extended shoulder adds strength behind the teeth for clean accurate cuts. The combination of using a greater hook angle than conventional blades, a reinforcing extended shoulder, and a more shallow gullet than conventional blades provides a better flush of the saw dust than conventional blades.

The hook angle of the teeth for the thin kerf circular saw blade ranges from about 32 degrees to about 37 degrees, preferably about 35 to about 36 degrees. The use of the hard tungsten carbide cutting elements enables the cutting teeth to be designed having a greater more aggressive hook angle. The aggressive hook angle causes the teeth to sever and penetrate with less effort. The combination of the hard carbide cutting elements, aggressive tooth hook angle, shallow gullet, and reinforcing extended shoulder in a thin kerf blade improves the cutting speed and durability of the blade, and allows for sufficient heat dissipation and expansion of the blade by the utilization of a plurality of expansion slots.

The 24 tooth, $7\frac{1}{4}$ inch, thin kerf blade of the present invention is designed to saw at a sustained cutting speed of about 5500 r.p.m. and remove about 3/1000 of an inch of material per tip load resulting in an increased speed of cut of about 13 feet per minute through $\frac{3}{4}$ inch medium density ply board at 5,500 rpm.

The fully hardened blade with the thin kerf profile builds speed, improves accuracy, resists bending, and adds stability. Shot peening the thin kerf blade tensions the blade and eliminates flutter and vibration.

The main body of the thin kerf blade is about 0.045 inches to about 0.085 inches in width as compared to conventional blades having a main body about 25 percent to about 45 percent thicker width. The thin kerf helps each tooth cut faster, smoother and more efficiently than with conventional width blades. The thin kerf design creates less drag on the saw and reduces the amount of stock that turns into sawdust. In addition, a friction reducing and non-stick coating reduces the tendency of wood resin from accumulating as a sticky residue of the blade body surface.

It is the primary object of the present invention to provide a high speed circular thin kerf saw blade employing a combination of design features including a plurality of spaced apart cutting teeth having an aggressive hook angle, a plurality of generally radial irregular shaped expansion slots uniformly distributed around the periphery of the blade, a shallow gullet between the teeth, a reinforcing extended shoulder supporting each tooth, a carbide cutting element providing a hard cutting surface for each tooth, and a thin main body profile to provide a thin kerf saw blade capable of cutting a thin kerf at a high speed of cut.

It is another object of the present invention to coat the main body of the blade with a friction reducing and non-stick coating to reduce the tendency of wood resin and similar sticky substances from accumulating as a sticky residue on the blade body surface and to provide a slick blade surface against the wood.

It is another object of the present invention to provide a thin kerf saw blade with an aggressive hook angle which bites quickly for fast cuts with less effort.

It is another object of the present invention to provide a thin kerf saw blade having sharp carbide teeth which can be resharpened.

It is another object of the present invention to provide a thin kerf saw blade having a plurality of expansion slots and holes to reduce stress and metal fatigue and to dissipate heat to prevent warpage of the blade.

It is another object of the present invention to provide a thin kerf saw blade wherein shot peening tensions the blade and eliminates flutter and vibration.

It is yet another object of the present invention to provide a thin kerf saw blade having a reinforcing extended shoulder adding strength behind the teeth for clean accurate cuts.

A further object of the present invention is to provide a thin kerf saw blade having a fully hardened body to add stability and resist bending.

Finally, it is an object of the present invention to provide a thin kerf circular saw blade having an improved performance in comparison with conventional carbide blades, attributable to the synergistic effect of optimizing the design parameters for each of the individual design features for each structural element of the blade and combining the features according to the present invention to obtain surprisingly good results in superior cutting speed, reduced tip wear, and reduced energy consumption.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 1 is a face elevational view of the saw blade of the present invention;

FIG. 2 is a left elevational view showing the saw blade of FIG. 1;

FIG. 3 is a right elevational view showing the saw blade of FIG. 1;

FIG. 4 is a top view showing the saw blade of FIG. 1;

FIG. 5 is a bottom view showing the saw blade of FIG. 1; and

FIG. 6 is a perspective fragmentary view showing the cutting elements and slot of the saw blade of FIG. 1.

DESCRIPTION OF THE PREFERRED EMBODIMENT

Figure 7:
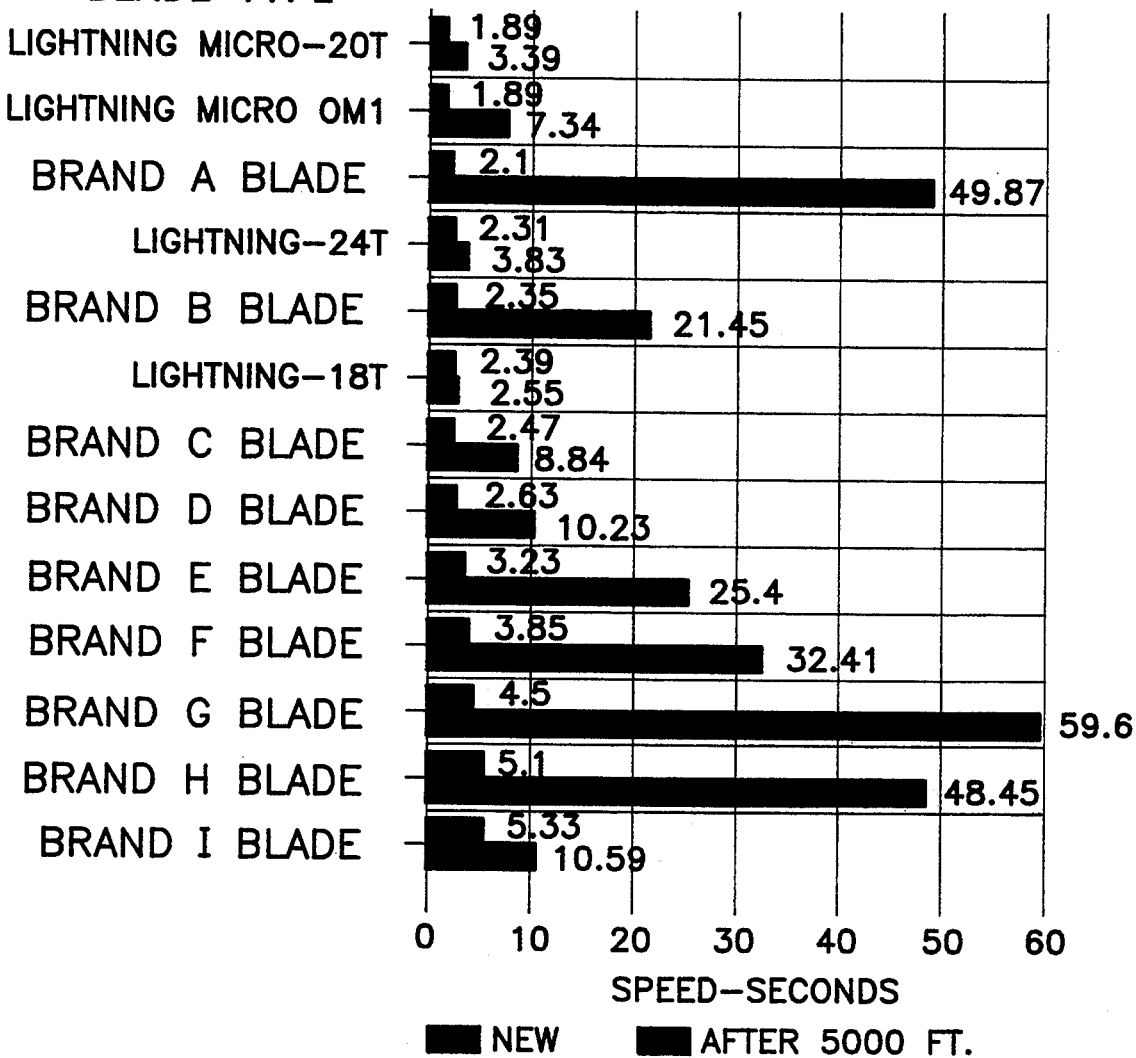
FIG. 7 is a bar graph showing the speed of cut test results of the thin kerf blade of the present invention as compared to competitor's saw blades.

Referring now to the drawings, the thin kerf circular saw blade 10 of the preferred embodiment has a disc shaped main body 12 having a pair of side faces 11, 13 and a central mounting opening or arbor 14. The main body 12 of the thin kerf saw blade 10 of the preferred embodiment has a width of about 0.045 inches to about 0.085 inches depending upon the diameter of the blade and is about 30 percent thinner than conventional carbide blades.

A plurality of saw teeth 16 are circumferentially spaced around the periphery of the main body 12 Each tooth comprises a cutting element 20 affixed to a tooth projection 9 having a leading edge 18 relative to the direction of rotation of the blade 10 (which is counter-clockwise according to FIG. 1). More particularly, the leading edge 18 of each tooth projection 9 is faced or tipped with a suitable cutting element 20 formed of harder substance than said main body 12 which is comprised of steel, the harder substance being a cemented carbide material such as tungsten carbide, and more particularly DYANITE® tungsten carbide material, (DYANITE® is a trademark of Vermont American Corporation), as described in U.S. Pat. No. 4,916,780 and U.S. Pat. No. 5,116,416. The DYANITE® carbide cutting insert 20 is a high, tough grade of carbide capable of providing a sharper edge that remains sharp up to five times longer than conventional tungsten carbide. As set forth in U.S. Pat. No. 4,916,780, the cemented carbide element carbide cutting element is a cemented carbide having a carbide phase comprised predominately of tungsten carbide, a binder phase comprised predominately of a cobalt phase, and a quarternary phase comprising tungsten, cobalt, boron and carbon. As set forth in U.S. Pat. No. 5,116,416, the cemented carbide cutting element is a cemented carbide having a carbide phase comprised predominately of tungsten carbide, a binder phase comprised predominately of a nickel phase, and a quarternary phase comprising tungsten, nickel, boron and carbon.

Each cutting element 20 comprises a front face surface 17, a rear surface 19, a bottom surface 21, a pair of side cutting edges 22 and a top cutting edge 23 shown in FIG. 2, is affixed to the leading edge 18 of each tooth projection 9. A portion of the main body 12 defining the leading edge 18 of each tooth projection 9 defines a notched recess pocket, or seat 15 for receiving and supportingly engaging the rear surface 19 and bottom surfaces 21 of each cutting element 20. The cutting elements 20 are held within the seat 15 and fastened to the leading edges 18 of the saw teeth projection 9 by welding or brazing or the like and are ground forming a pointed tooth 16 having a top cutting edge 23 angled from about 0 degrees to 3 degrees with respect to the outer peripheral portion of the main body 12 as shown in Angle X of FIG. 1.

The peripheral portion of the main body 12 extending from the front face surface 17 of the cutting element 20 forward toward the top of the leading edge 18 of the preceding tooth 16 forms a shallow, generally straight gullet 26 which makes a smooth continuous transition blending into a generally straight extended shoulder 24 defining a back angle "A" in the range of about 15 degrees to about 25 degrees depending upon the diameter of the blade 10. Shoulder back angle, Angle A, as shown in the preferred embodiment is about 17 degrees. The extended shoulder 24 provides additional structural strength to reinforce the leading edge of the tooth 16 and cutting element 20 thereon, and to support the stress placed upon the teeth 16 by the aggressive hook of the teeth 16 and the high cutting speed of the blade. The reinforcing extended shoulder 24 also helps to guide the blade 10 and provide cleaner and more accurate cuts.

In the preferred embodiment of the present invention, the teeth 16 are spaced evenly about the outer perimeter of the blade 10 and each tooth 16 is separated by a shallow gullet 26 adjacent to the cutting edge 20 and extending to the shoulder 24 to facilitate the removal of saw dust and chips. The shallow gullet 26 runs truer than the typical deep gullet used in conventional blades, and the shallow gullet 26 reduces the flexing of the cutting elements 20 and blade body 12 which is especially important in a saw blade 10 utilizing an aggressive hook angle.

The circular saw blade 10 is provided with a plurality of generally narrow expansion slots 30 extending downward from the gullets 26 between selected teeth 16 of the main body 12. Preferably three to four expansion slots 30 extend inwardly from the outer perimeter of the saw blade 10 preceding selected teeth 16, through the main body 12 from one side face 11 to the other side face 13. The expansion slots 30 dissipate stress formed by the friction of the teeth 16 cutting into the wood, and aid in cooling the blade and the removal of sawdust. The number of expansion slots 30 is dependent upon the number of teeth 16 on the blade 10 in that the teeth 16 are arranged in consecutive multiples, for example, of three, four, or five teeth 16 between each slot 30. The expansion slots 30 are equally spaced around the blade circumference. Any number of slots 30 ("X") can be used depending upon the number of teeth 16 around the periphery of the blade 10, provided the number (X) can be divided into the number of teeth 16 ("Y") to provide an even division with no remainder. For example, the 24 tooth, 7¼ inch, thin kerf blade 10 of the preferred embodiment utilizes four expansion slots 30, whereas a blade 10 with eighteen teeth 16 would use three expansion slots 30.

The expansion slots 30 of the thin kerf circular saw blade 10 of the preferred embodiment have a varying width of from 1/16 of an inch to about ¼ of an inch in width, and about 1¼ inches in length formed in the outer edge of the blade 10 in a generally radial direction directly aligned with the center 14 of the blade 10. The depth of the slot 30 may be designed to vary according to the depth of the material being cut so that the length of the expansion slot 30 being a depth at least as thick as the material being cut, for example from about 1 inch to about 1½ inches in length. A generally round stress dispersion hole 32 is provided at the bottom of each slot 30 to alleviate stresses and prevent cracks in the blade 10. The diameter of the stress dispersion hole 32 is in the range of about 3/16 to about 5/16 of an inch in diameter, and more particularly the diameter of the stress dispersion hole 32 of the preferred embodiment is about ¼ inch in diameter.

The expansion slots 30 in the preferred embodiment are formed in the general shape of a "lightning bolt" having a depth ranging from about 1 inch to about 1½ inches, and more particularly about 1¼ inches in length, and a generally round stress dispersion hole 32 provided at the bottom of each slot 30. The "lightning bolt" shape is a design choice rather than a functional shape. The dimensions of the lightning bolt expansion slots 30 are about the same for thin kerf saw blades 10 of various diameters.

More particularly, as shown in FIG. 6, the expansion slots 30 extend generally radially inward from the narrow gullet 26 toward the central opening 14 forming a first outer slot portion 34 increasing in width from the periphery of the main body 12 to about the center of the expansion slot 30, a wide second central slot portion 36 joining the first outer slot portion 34 extends upward into the blade body 12 at a positive angle extending past and to the side of the lower end portion of the first outer slot portion 34, and a narrowing third inner slot portion 38 joined to the second central slot portion 36 extends generally radially downward past and to the side of the first outer slot portion 34 ending in an stress dispersion hole 32 at the bottom of the expansion slot 30 having a larger diameter than the distal end of the third inner slot 38.

The expansion slots 30 extend blade life by alleviating metal stress, reducing heat buildup, and eliminating warping. The expansion slots 30 also increase the surface area of the blade resulting in better heat transfer between the metal, ambient temperature cooling air, and the sawdust particles flowing through the slots 30. The expansion slots 30 also permit expansion and contraction of the blade due to the thermal stress and metal fatigue experienced in high speed circular saw blades 10 because of the heating and cooling of the blade during use. The slots 30 also reduce saw blade vibrations allowing the user to saw in a straight path with less weaving.

The front face 17 and side cutting edges 22 of the cutting element 20 are formed at a positive hook angle "B" in a range of from about 30 degrees to a range of about 40 degrees relative to a radial line extending from the center of the blade 10 to the periphery of the blade 10, and more particularly about 36 degrees as shown in the preferred embodiment in FIG. 1. The aggressive hook angle "B" of the thin kerf blade 10 is greater than that of conventional blades which were limited to a hook angle of about 26 degrees due to lower cutting speeds of 2,000 to 2,500 r.p.m., and because of heat buildup and stress experienced by the teeth and blades. However, the use of tungsten carbide cutting elements 20, and especially a tough grade of carbide such as the DYANITE ® carbide, in combination with a reinforcing extended shoulder 24 provides a means of sustaining an increased cutting speed of about 5,500 r.p.m. using an aggressive hook angle of about 36 degrees to achieve an improved cutting speed.

As shown in FIGS. 2–5, each of the cutting elements 20 are ground to have a front face surface 17 being generally rectangular in shape and having a width that symmetrically decreases about 1 degree to about 5 degrees from the top cutting edge 23 to the bottom surface 21 gradually tapering downward to the same width as the main body 12 of the blade 10 as shown by Angle "Y" of FIG. 4. Furthermore, the side cutting edges 22 gradually taper inward from the front cutting edge face surface 17 to the rear edge surface 19 to present a smooth transition with the leading edge 18 of the tooth 16 formed as part of the main body 12 as shown in FIG. 3.

The front face 17 and top cutting edge 23 of each of the cutting elements 20 are ground diagonally in the horizontal plane, alternately from left to right, from face side 11 to face side 13, and from face side 13 to face side 11 forming an alternating top bevel on the leading edge of the cutting element 20 of each tooth 16 of about 5 degrees to about 15 degrees. Moreover, the alternating top bevel of the preferred embodiment is about 10 degrees, as shown by Angle "C" in FIG. 2. The front face 17 and top cutting edge 23 of each of the cutting elements 20 are ground diagonally in the vertical plane, alternately from top to bottom, from the front face surface 17 to the top cutting edge 23, and from the top cutting edge 23 to the front face surface 17 forming an alternating top bevel back angle of about 10 degrees to about 15 degrees, more particularly about 12 degrees, shown as Angle "D" in FIG. 1.

Alternate top beveling of the cutting elements 20 provides a means for chip clearance between each tooth 16, and the lateral extension of the cutting element 20 reduces lateral pressure against the sides of the wood so that the saw blade 10 tends to effectively work its way through binding conditions without creating excessive heat and facilitate cooling running of the blade.

As shown in FIG. 2–5, each cutting edge 20 overhangs the main body 12 by about 5/1000 of an inch to about 25/1000 of an inch, and more particularly as shown in the preferred embodiment by about 12/1000 of an inch as measured from the leading edge 18 of the tooth 16 adjacent the face of the tip. Since the width of each cutting element 20 is greater than the width of the main body 12, the width of the cutting elements 20 determine the width or kerf of the cut of the saw 10 sawing through wood, plastic, or other fibrous material. The thin main body 12 allows the use of narrow cutting elements 20 resulting in a thinner kerf than conventional carbide blades with less waste and a fast cutting speed.

The thin kerf circular saw blade of the present invention is formed by a process of cutting a blank having an arbor hole therein of the desired size and having the desired number of teeth out of a roll of coiled steel. The blank is rolled flat and the desired number of slots are stamped from the blank. Carbide tips are brazed to the teeth forming the cutting edges therefor. The carbide tips brazed portions are then ground and polished to a smooth finish. The finished blade may be coated with a water based lacquer, a silicone coating, a wax coating, or a polytetrafluoroethylene coating, such as TEFLON to provide a smooth appearance and provide a friction reducing coating having a anti-sticking slick surface. The silicone coating may be silicon based compound comprising a silicon polymer, co-polymer, or oil, or a silicon compound may be added as a component of a water based lacquer. The anti-stick friction reducing coatings such as silicon reduce the tendency of substances such as wood resin from accumulating as a sticky residue on the main blade body, and provide a lubricating effect between the blade body and the material being cut to increase the overall performance of the thin kerf blade.

EXPERIMENTAL EVALUATION

FIGURE 7

The test results of FIG. 7 show all four of the LIGHTNING TM thin kerf circular saw blades (the LIGHTNING TM MICRO-20T, the LIGHTNING TM MICRO-OM1, LIGHTNING TM 18-T and the LIGHTNING TM 24-T ) provide superior cutting speed as measured in feet per second as a new blade and after 5,000 feet of use cutting a ¾ inch medium density ply board at a rate of 13 feet per minute at 5500 rpm.

FIGURE 8

Figure 8:
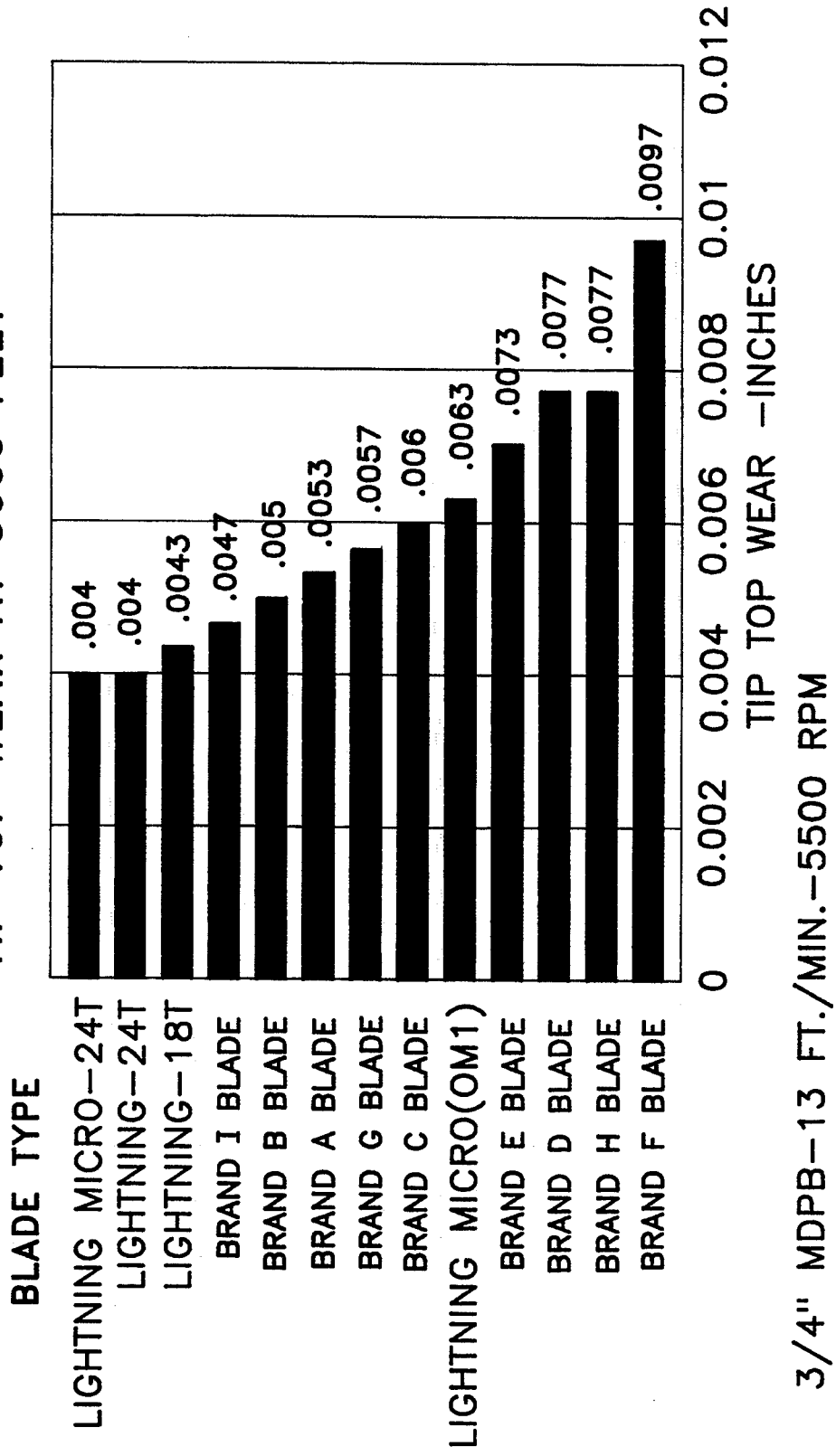
FIG. 8 is a bar graph showing the results of the Saw Blade Test Tip Top Wear Test at 5,000 Feet comparing the thin kerf blade of the present invention with competitor's saw blades.

The test results of FIG. 8 show three of the four LIGHTNING TM thin kerf circular saw blades (the LIGHTNING TM MICRO-20T, the LIGHTNING TM 18-T and the LIGHTNING TM 24-T) outperforming additional competitor's saw blades as measured by the wear rate of the tip wear at 5,000 feet as tested using ¾ inch medium density ply board at a rate of 13 feet per minute at 5,500 rpm.

FIGURE 9

Figure 9:
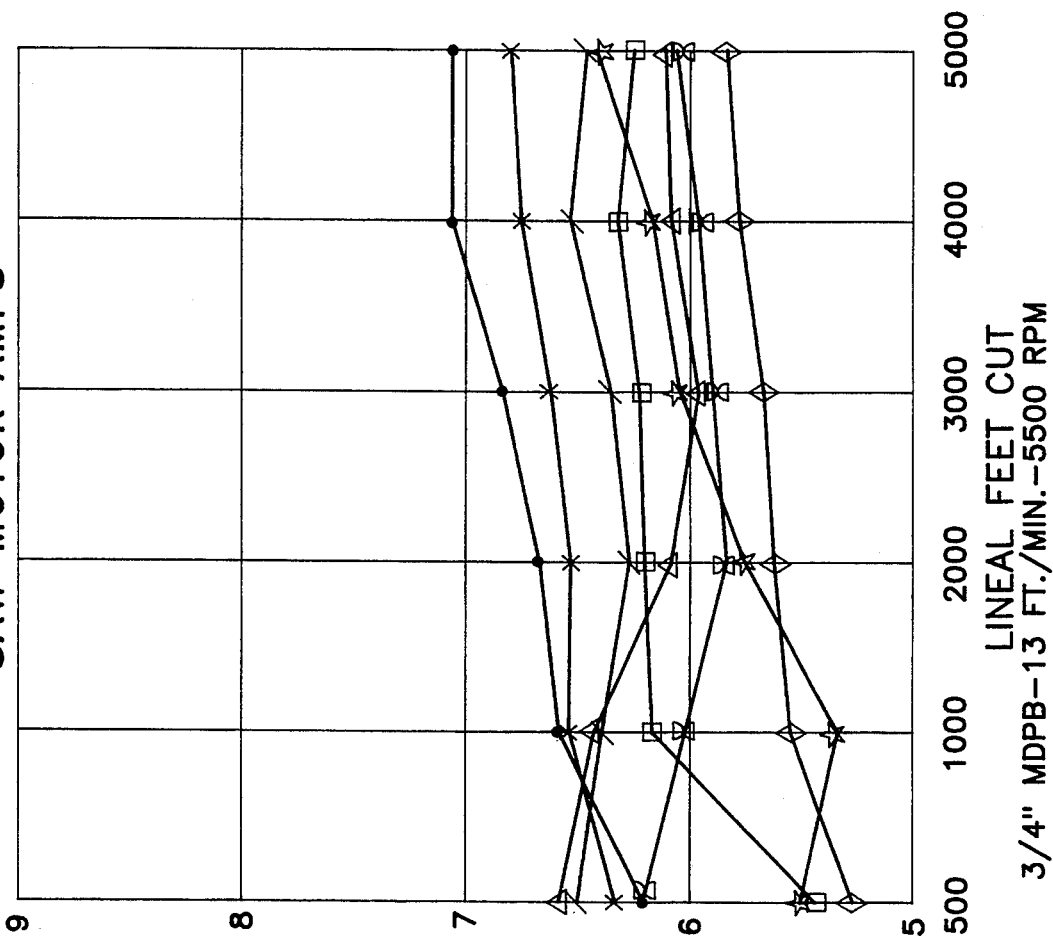
FIG. 9 is a line graph showing the results of the Saw Motor Amps Saw Blade Test comparing the thin kerf blade of the present invention with competitor's saw blades.

The test results of FIG. 9 show the LIGHTNING TM MICRO-20T, the LIGHTNING TM 18-T and the LIGHTNING TM 24-T thin kerf saw blades designed in accordance with the present invention outperform competitor's saw blades resulting in a reduction in saw motor amps after cutting for 5,000 feet as tested using ¾ inch medium density ply board at a rate of 13 feet per minute at 5,500 rpm.

FIGURE 10

Figure 10:
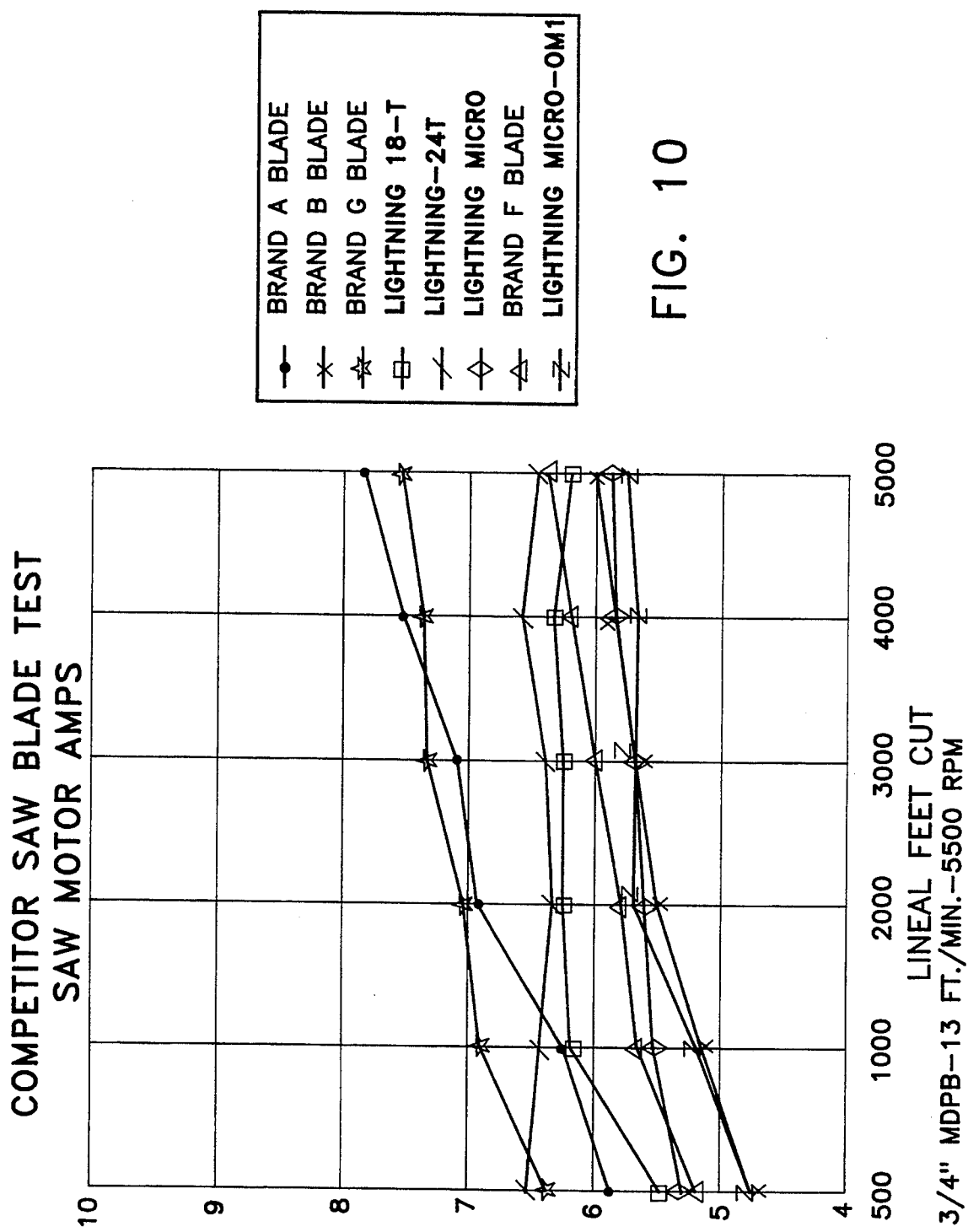
FIG. 10 is a line graph showing the results of the Saw Motor Amps Saw Blade Test comparing the thin kerf blade of the present invention with competitor's saw blades.

The test results of FIG. 10 show the LIGHTNING TM MICRO-20T, the LIGHTNING TM MICRO-OM1, the LIGHTNING TM 18-T and the LIGHTNING TM 24-T thin kerf saw blades designed in accordance with the present invention outperform competitor's saw blades as measured by the using less saw motor amps to saw after cutting for 5,000 feet as tested using ¾ inch medium density ply board at a rate of 13 feet per minute at 5,500 rpm.

TABLE I

| | SPEED OF CUT TEST RESULTS Seconds to Cut ¾" MDPB (4 Foot Length) | | | |
|---|---|---|---|---|
| | TIME NEW BLADE | TIME AFTER 5000 FT. | % REDUCTION IN CUTTING SPPED | SLOWS FACTOR TIMES |
| LIGHTNING-18T | 2.39 | 2.55 | 6.6 | 1.1X |
| LIGHTNING-24T | 2.31 | 3.83 | 66.2 | 1.7X |
| LIGHTNING-MICRO-20 | 1.89 | 3.39 | 79.5 | 1.8X |
| BRAND I BLADE | 5.33 | 10.39 | 98.7 | 2.0X |
| BRAND C BLADE | 2.47 | 8.84 | 258.4 | 3.6X |
| LIGHTNING-MICRO OM1 | 1.89 | 7.34 | 288.2 | 3.9X |
| BRAND D BLADE | 2.63 | 10.23 | 289.6 | 3.9X |
| BRAND E BLADE | 3.23 | 25.40 | 687.1 | 7.9X |
| BRAND F BLADE | 3.85 | 32.41 | 741.8 | 8.4X |
| BRAND B BLADE | 2.35 | 21.45 | 814.1 | 9.1X |
| BRAND H BLADE | 5.10 | 48.45 | 850.6 | 9.5X |
| BRAND G BLADE | 4.50 | 59.60 | 1224.4 | 13.2X |
| BRAND A BLADE | 2.10 | 49.07 | 2240.5 | 23.4X |

The graphs shown in FIGS. 7–12, and the data provided in Tables I and II, show the results of an independent test performed comparing the "LIGHTNING TM " thin kerf circular saw blade of the present invention with similar competitive circular saw blades of various manufacturer's.

TABLE I

The test results of Table I show three of the four LIGHTNING TM thin kerf circular saw blades (the LIGHTNING TM MICRO-20T, the LIGHTNING TM 18-T and the LIGHTNING TM 24-T) outperforming additional competitor's saw blades as measured by speed of cut test results in seconds to cut a four foot section of ¾ inch medium density ply board. The LIGHTNING TM blades provide faster cutting speeds for new blades, and after 5,000 feet of use. The table set forth these results in Percent Reduction in Cutting Speed and a Slow Factor multiplier.

FIGURE 11

Figure 11:
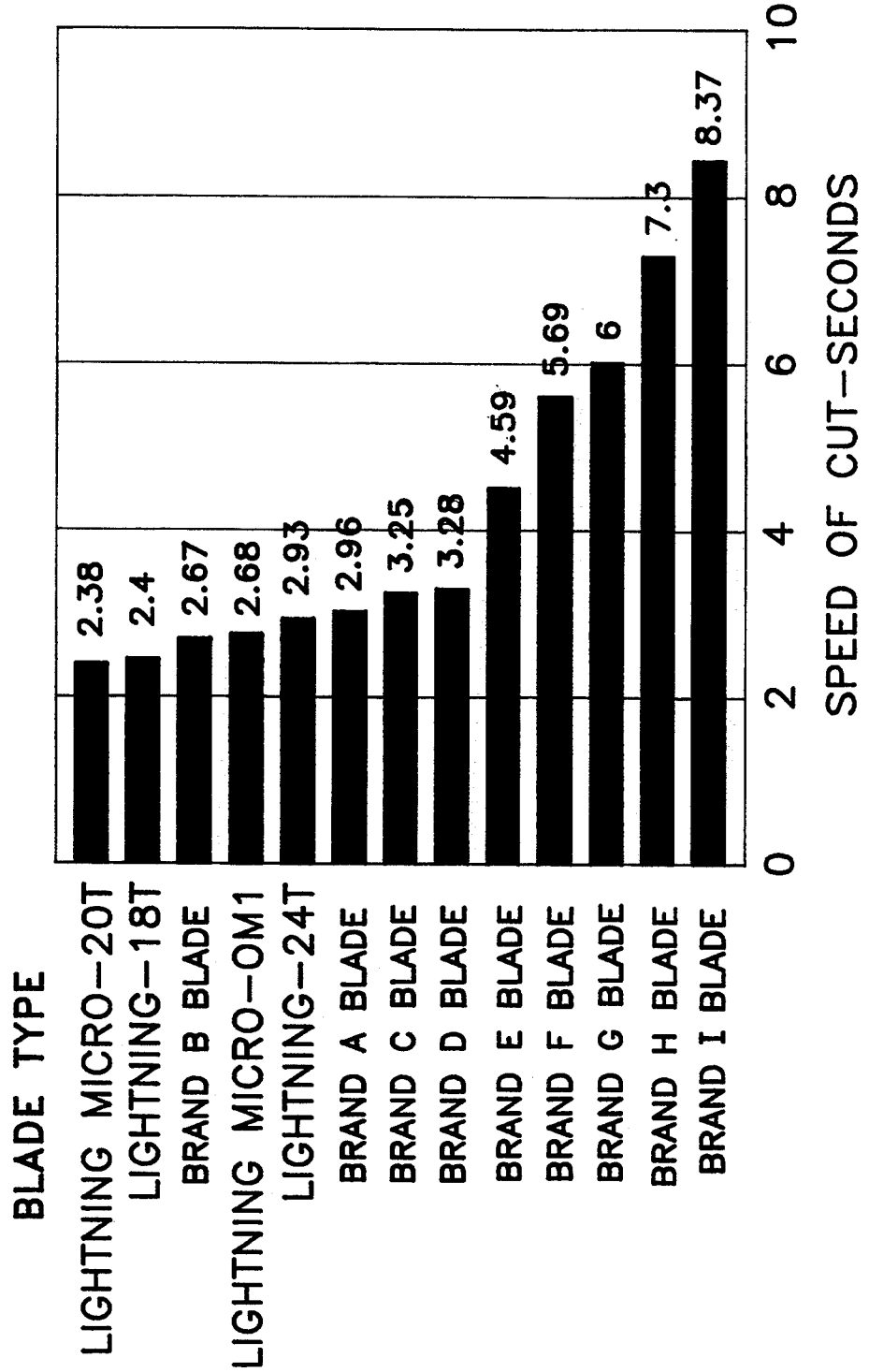
FIG. 11 is a bar graph showing the results of the Saw Blade Test Speed of Cut Test comparing the thin kerf blade of the present invention with competitor's saw blades.

The test results of FIG. 11 show the LIGHTNING TM MICRO-20T, the LIGHTNING TM MICRO-OM1, the LIGHTNING TM 18-T and the LIGHTNING TM 24-T thin kerf saw blades designed in accordance with the present invention outperform competitor's saw blades, whereby an average of ten saw blades were used to determine the speed of cut in seconds through four feet lengths of ¾ inch medium density ply board at 5,500 rpm.

FIGURE 12

Figure 12:
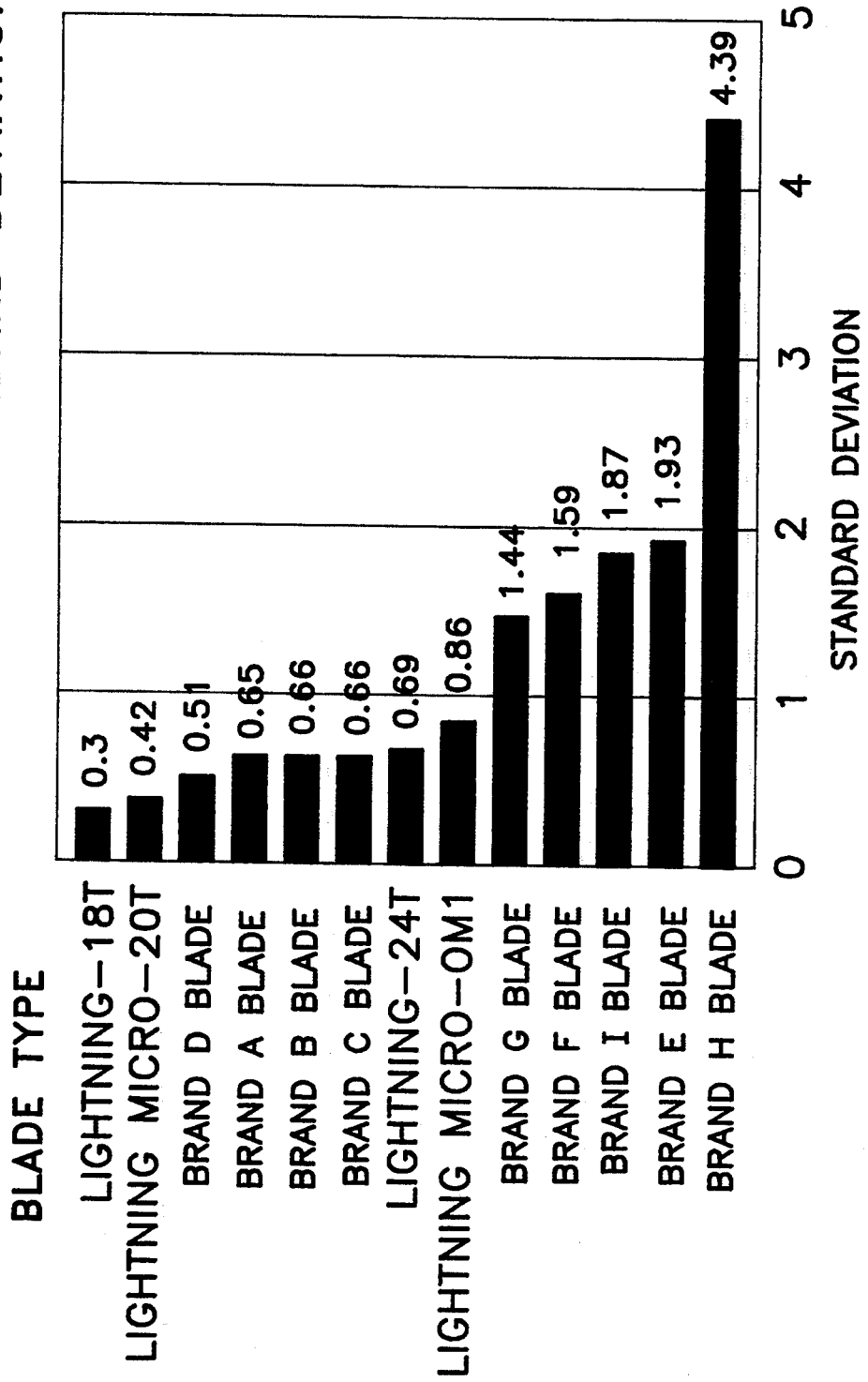
FIG. 12 is a bar graph showing the results of the Saw Blade Speed of Cut-Standard Deviation Test comparing the thin kerf blade of the present invention with competitor's saw blades.

The test results of FIG. 12 show the standard deviation for the LIGHTNING TM MICRO-20T, the LIGHTNING TM MICRO-OM1, the LIGHTNING TM 18-T, the LIGHTNING TM 24-T thin kerf saw blades designed in accordance with the present invention and competitor's saw blades, whereby an average of ten saw blades were used to determine the speed of cut in seconds through four feet lengths of ¾ inch medium density ply board at 5,500 rpm.

TABLE II

| BLADE | SPEED OF CUT SUMMARY | |
|---|---|---|
| | AVERAGE SPEED | STANDARD DEVIATION |
| LIGHTNING #3-20T (MICRO KERF) | 2.38 | 0.42 |
| LIGHTNING #1-18T | 2.40 | 0.30 |
| BRAND B BLADE | 2.67 | 0.66 |
| LIGHTNING #4-20T (MICRO-OM1R) | 2.68 | 0.86 |
| LIGHTNING #2-24T | 2.93 | 0.69 |
| BRAND A BLADE | 2.96 | 0.65 |
| BRAND C BLADE | 3.25 | 0.66 |
| BRAND D BLADE | 3.28 | 0.51 |
| BRAND E BLADE | 4.59 | 1.93 |
| BRAND F BLADE | 5.69 | 1.59 |
| BRAND G BLADE | 6.00 | 1.44 |
| BRAND I BLADE | 7.30 | 1.87 |
| BRAND H BLADE | 8.37 | 4.39 |

TABLE II

The test results of Table II summarize the average speed of cut and the standard deviation for the LIGHTNING TM MICRO-20T, the LIGHTNING TM MICRO-OM1, the LIGHTNING TM 18-T, the LIGHTNING TM 24-T thin kerf saw blades and competitor's saw blades clearly showing the superior performance of the thin kerf saw blades designed in accordance with the present invention.

As demonstrated by the preceding examples set forth in FIGS. 7–12 and Tables I and II, optimizing the design parameters for each structural element of the blade and combining the features according to the present invention provides surprisingly good test results to provide a thin kerf circular saw blade exhibiting superior cutting speed, reduced tip wear, and reduced energy consumption due to the synergistic effect of the design of the blade components heretobefore not demonstrated by conventional carbide blades.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims.

I claim:
1. A thin kerf circular saw blade, comprising:
a generally circular main body having a pair of side faces and a plurality of teeth, each one of said teeth comprising a tooth projection having a cutting element affixed thereto, said teeth being spaced about the periphery of said main body, said cutting element having a positive hook angle of about 30 degrees to about 40 degrees relative to a radial line extending from the center of said main body to the periphery of said main body;
said saw blade having a central opening for mounting;
said main body of said saw blade having a plurality of expansion slots disposed between selected teeth and extending inwardly from the periphery of said saw blade toward said central opening;
each of said cutting elements being a carbide cutting element affixed to a leading edge of each one of said tooth projections, each of said carbide cutting elements tapering inwardly from top to bottom and front to back, each of said carbide cutting elements having cutting edges of greater width than said main body, each of said carbide cutting elements having an alternating top bevel so that a portion of said cutting edges alternately project laterally beyond the face of at least one side of said main body;
a shallow generally straight gullet between each tooth; and
a continuous extended shoulder extending from said gullet supporting each of said teeth.

2. The thin kerf circular saw blade of claim 1, wherein each of said cutting element is secured in a seat defined within the leading edge of each tooth projection, said seat supportingly engaging said cutting element against movement circumferentially of said body.

3. The thin kerf circular saw blade of claim 1, wherein said cutting elements are welded or brazed to said tooth projection.

4. The thin kerf circular saw blade of claim 1, wherein said carbide cutting element is a cemented carbide having a carbide phase comprised predominately of tungsten carbide, a binder phase comprised predominately of a cobalt phase, and a quarternary phase comprising tungsten, cobalt, boron and carbon.

5. The thin kerf circular saw blade of claim 1, wherein said carbide cutting element is a cemented carbide having a carbide phase comprised predominately of tungsten carbide, a binder phase comprised predominately of a nickel phase, and a quarternary phase comprising tungsten, nickel, boron and carbon.

6. The thin kerf circular saw blade of claim 1, wherein said slots extend generally radially inward toward said central opening.

7. The thin kerf circular saw blade of claim 1, said main body having at least three expansion slots.

8. The thin kerf circular saw blade of claim 1, wherein said expansion slots are equally distributed between selected teeth.

9. The thin kerf circular saw blade of claim 1, including at least one stress dispersion hole interconnecting at least one of said expansion slots.

10. The thin kerf circular saw blade of claim 1, further including a stress dispersion hole at the bottom of each expansion slot.

11. The thin kerf circular saw blade of claim 10, wherein said stress dispersion holes are generally circular in shape.

12. The thin kerf circular saw blade of claim 1, wherein said shoulder defines a back angle in the range of about 15 degrees to about 25 degrees depending upon the diameter of said blade.

13. The thin kerf circular saw blade of claim 1, including a protective coating on said main body.

14. The thin kerf circular saw blade of claim 13, wherein said protective coating is a water based lacquer 15. The thin kerf circular saw blade of claim 13, wherein said protecting coating includes an anti-stick and friction reducing agent selected from the group comprising silicon, polytetrafluoroethylene, or wax.

16. The thin kerf circular saw blade of claim 15, wherein said friction reducing agent is a silicon based compound comprising a silicone polymer, a silicone co-polymer, or silicone oil.

17. The thin kerf circular saw blade of claim 1, including an anti-stick and friction reducing coating selected from the group comprising silicon, polytetrafluoroethylene, or wax.

18. The thin kerf saw blade of claim 1, wherein said cutting elements have an alternating top bevel so that a portion of said cutting edges alternately project laterally in opposite directions beyond the faces of said main body.

19. The thin kerf saw blade of claim 1, said cutting elements extending substantially the full length of said tooth projections intersecting at said gullet.

20. A thin kerf circular saw blade, comprising:
a generally circular main body having a pair of side faces and a plurality of teeth, each one of said teeth comprising a tooth projection having a cutting element affixed thereto, said teeth being spaced about the periphery of said main body, said cutting element having a positive hook angle of about 30 degrees to about 40 degrees relative to a radial line extending from the center of said main body to the periphery of said main body;
said saw blade having a central opening for mounting;
said main body of said saw blade having a plurality of expansion slots disposed between selected teeth and extending inwardly from the periphery of said saw blade toward said central opening
each of said cutting elements being a carbide cutting element affixed to a leading edge of each one of said tooth projections, each of said carbide cutting elements tapering inwardly from top to bottom and front to back, each of said carbide cutting elements having cutting edges of greater width than said main body each of said carbide cutting elements having an alternating top bevel so that a portion of said cutting edges alternately project laterally beyond the face of said main body;
a shallow straight gullet between each tooth; and
a continuous extended shoulder extending from said gullet supporting each of said teeth.

* * * * *